(12) United States Patent
Lai et al.

(10) Patent No.: US 7,151,579 B2
(45) Date of Patent: Dec. 19, 2006

(54) THIN FILM TRANSISTOR ARRAY SUBSTRATE AND REPAIRING METHOD OF THE SAME

(75) Inventors: Han-Chung Lai, Taoyuan Hsien (TW); Chun-Hao Su, Jhonghe (TW); Wen-Chih Chen, Renwu Township, Kaohsiung County (TW)

(73) Assignee: Au Optronics Corporation, Hsinchu (TW)

( * ) Notice: Subject to any disclaimer, the term of this patent is extended or adjusted under 35 U.S.C. 154(b) by 107 days.

(21) Appl. No.: 10/828,116

(22) Filed: Apr. 19, 2004

(65) Prior Publication Data

US 2005/0174505 A1    Aug. 11, 2005

(30) Foreign Application Priority Data

Feb. 5, 2004    (TW) ............................... 93102571 A (51) Int. Cl.
*G02F 1/1333*    (2006.01)
(52) U.S. Cl. ........................... 349/54; 349/55; 349/192
(58) Field of Classification Search ................. 349/54, 349/55
See application file for complete search history.

(56) References Cited

U.S. PATENT DOCUMENTS 5,303,074 A * 4/1994 Salisbury ..................... 349/55
6,831,295 B1 * 12/2004 Tsubo .......................... 257/48

* cited by examiner

*Primary Examiner*—Andrew Schechter
*Assistant Examiner*—Richard H Kim
(74) *Attorney, Agent, or Firm*—J. C. Patents (57) ABSTRACT

A thin film transistor (TFT) array substrate includes a substrate, a plurality of scan lines, a plurality of data lines, a plurality of thin film transistors, a plurality of pixel electrodes, and a plurality of pairs of repair pads is provided. A plurality of pixel regions are defined by the scan lines and the data lines over the substrate. The thin film transistors are disposed in the pixel regions and driven by the scan lines and the data lines. Each pixel electrode is disposed in the region, and is electrically connected to the thin film transistor. The repair pads are disposed under the data line. In addition, the repairing process includes welding the defective data line with the quasi-welding repair pad, and then forming a repair line to reconnect the defective data line.

14 Claims, 9 Drawing Sheets

THIN FILM TRANSISTOR ARRAY SUBSTRATE AND REPAIRING METHOD OF THE SAME

CROSS-REFERENCE TO RELATED APPLICATION

This application claims the priority benefit of Taiwan application serial no. 93102571, filed on Feb. 5, 2004.

BACKGROUND OF THE INVENTION

1. Field of the Invention

The present invention generally relates to a thin film transistor (TFT) array substrate and the repairing method thereof. More particularly, the present invention relates to a TFT array substrate and the repairing method thereof having high yield of repairing.

2. Description of Related Art

In recent years, the multimedia and the related devices are developed extensively due to the leaps and bonds of the semiconductor device or the display device. As to the display device, the cathode ray tube (CRT) were broadly used in the past because of the good display quality and the low price. However, the cathode ray tube has the disadvantages of large size, high power consumption and high environmental concerns. Since the liquid crystal display (LCD) has the advantages of light weight, small size, thin thickness, low power consumption, low radiation and environmentally, the cathode ray tube is being gradually replaced by the liquid crystal display. In general, the thin film transistor (TFT) LCD is most popularly applied in the LCD device.

Conventionally, the liquid crystal display (LCD) have dot defect or line defect problems. In general, a dot defect is generated due to the abnormal electrical conduction between the top and bottom electrodes of the pixel capacitor by particle or defect. Moreover, the dot defect may also be generated due to the abnormal electrical conduction at the intersection of scan line and data line, thus, a white spot or a dark spot is formed in the intersection. Usually, a line defect is generated by the breaking of scan line or data line. The yield of a liquid crystal display (LCD) is quite dependent on the dot defect or line defect that typically generate during the manufacturing of the LCD. Therefore, the repairing of the dot defect or line defect to further improve the display quality is very important. Hereinafter, a conventional repairing technology will be described with reference to FIG. 1.

Figure 1:
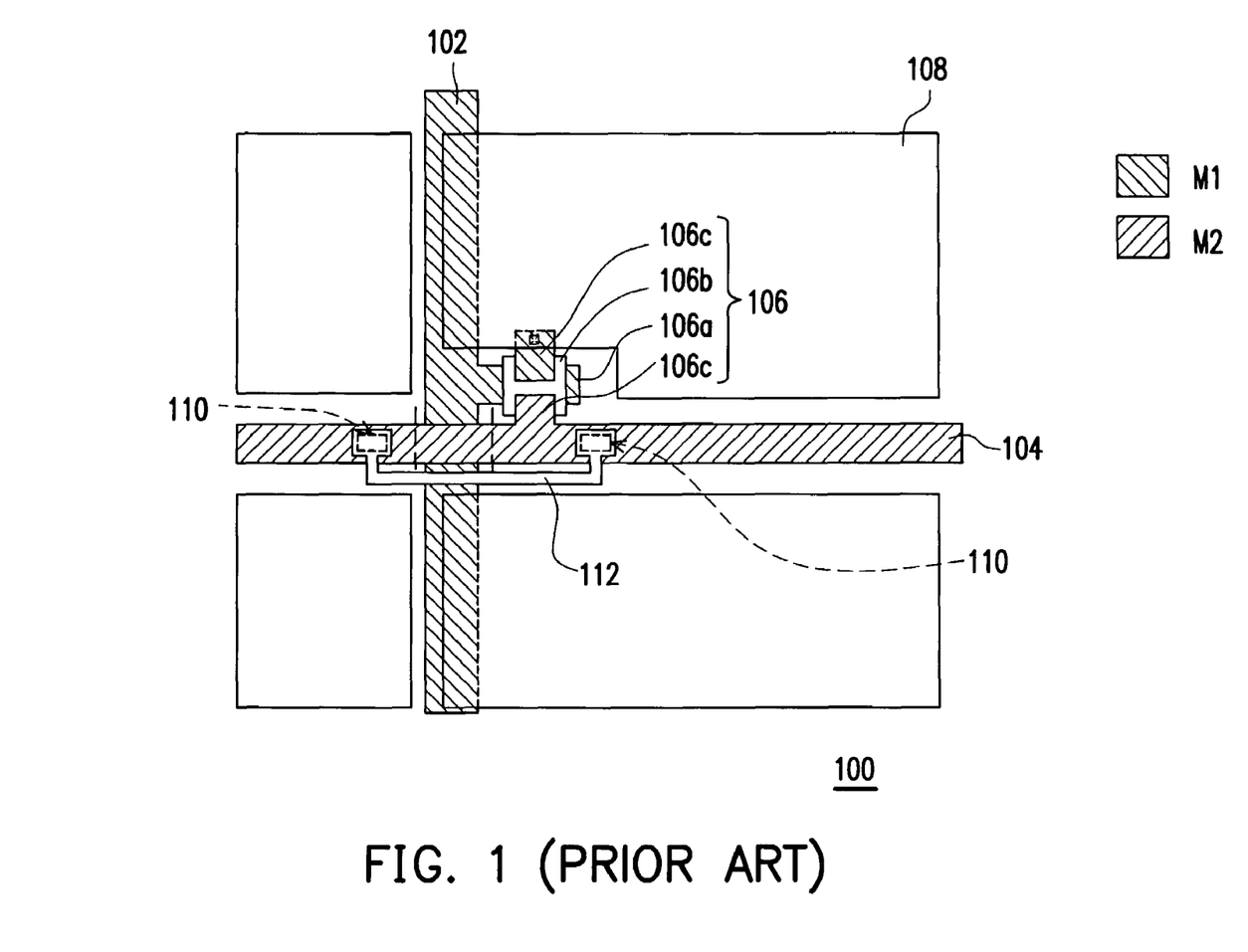
FIG. 1 is a drawing schematically illustrating a conventional laser chemical vapor deposition (CVD) repairing method.

FIG. 1 is a drawing schematically illustrating the conventional laser chemical vapor deposition (CVD) repairing method. Referring to FIG. 1, a conventional pixel structure 100 includes at least a scan line 102, a signal line 104, a thin film transistor (TFT) 106 and a pixel electrode 108. The thin film transistor (TFT) 106 includes a gate 106a, a channel layer 106b and a source/drain 106c, in which the gate 106 is electrically connected to the scan line 102, and the source/drain 106c are electrically connected to the signal line 104 and pixel electrode 108 respectively.

Since the scan line 102 is a portion of the first metal layer M1, and the signal line 104 is a portion of the second metal layer M2, the scan line 102 and the signal line 104 are electrically insulated from each other by a first dielectric layer (or called gate isolation layer). Moreover, a second dielectric layer (or a protection layer) may be formed to cover the signal line 104. However, the intersection of the scan line 102 and the signal line 104 may be shorted abnormally due to the faulty the dielectric layer, for example, due to contamination by impurity or particles. Thereafter, repairing of the abnormally shorted intersection is required. A conventional repairing method is to cut both ends of the signal line 104 of the shorted intersection shown by the dotted line in FIG. 1. Then, two repairing openings 110 are formed by irradiating laser on the second dielectric layer. Thereafter, a repair line 112 is formed to reconnect the cut signal line 104 via the opening 110 by performing a laser chemical vapor deposition (CVD) process. Therefore, the abnormally shorted intersection is repaired by a conventional method.

Figure 2:
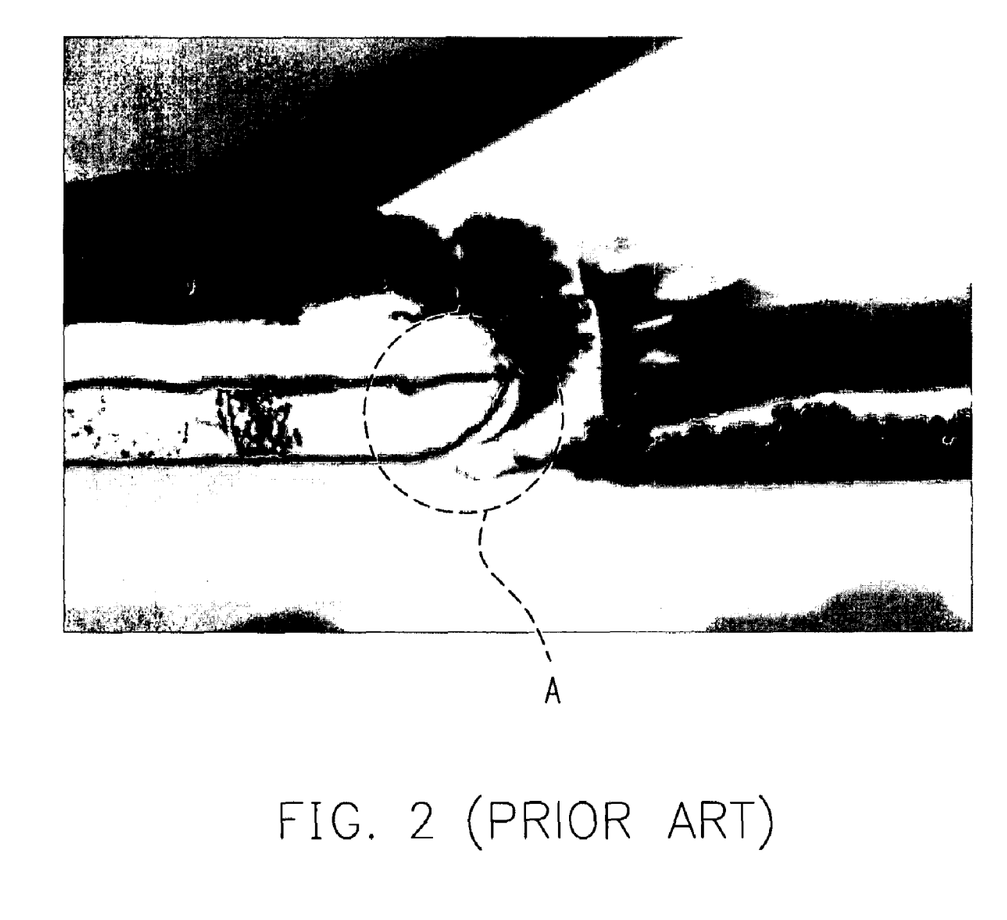
FIG. 2 is a cross-sectional view illustrating an intersection repaired by a conventional laser repairing method.

FIG. 2 is a cross-sectional view of the intersection repaired by a conventional laser repairing method. Referring to FIG. 2, it is noted that the data line 104 may get damaged by laser beam when repairing in the openings 110. Since a conventional data line 104 is usually comprised of molybdenum, aluminum and molybdenum multilayer metal structure, and the melting point of aluminum is less than that of the molybdenum. Therefore, after the data line 104 laser is irradiated by the laser beam to form the opening 110, the aluminum metal layer will get vaporized resulting in a formation of a data line with bent profile A as shown in FIG. 2. It is to be noted that, the repair line 112 formed by laser chemical vapor deposition (CVD) process may be susceptible to breakage near the bent section at the bent profile A, and thus the repairing technique using laser CVD process is accordingly not desirable.

SUMMARY OF THE INVENTION

Accordingly, the present invention is directed to a thin film transistor (TFT) array substrate capable of avoiding the open circuit of the repair line formed during the repairing process and thereby increase the repairing yield.

In addition, the present invention is also directed to a method of repairing a TFT array substrate capable of avoiding the open circuit of the repaired line formed during the repairing process and thereby increasing the repairing yield.

In an embodiment of the present invention, the thin film transistor (TFT) array substrate, includes, for example but not limited to, a substrate, a plurality of scan lines, a plurality of data lines, a plurality of thin film transistors, a plurality of pixel electrodes, and a plurality of repair pads. A plurality of pixel regions are defined by the scan lines and the data lines disposed over the substrate. The thin film transistors are disposed in the pixel regions and driven by the scan lines and the data lines. Each pixel electrode is disposed in the pixel region and electrically connected to the thin film transistor. The repair pads are disposed under the data lines.

In one embodiment of the invention, the TFT array substrate further includes, for example but not limited to, a plurality of quasi-welding repair pads and at least a repair line. The quasi-welding repair pads are disposed under the data lines. The repair line crosses over at least a defective scan line of the scan line. It is noted that, the defective data line includes, for example but not limited to, a defective line disposed above the defective scan line and two normal lines disposed on both sides of the defective scan line. The normal lines are welded to the quasi-welding repair pads and mutually connected by the repair line.

In one embodiment of the invention, the quasi-welding repair pads are set in pairs. In another embodiment of the invention, the quasi-welding repair pads are set in pairs, and a partial portion of the quasi-welding repair pads are disposed under the data lines.

In one embodiment of the invention, the data line includes, for example but not limited to, a multilayer metal structure comprising a first metal layer, a second metal layer and a third metal layer. The melting point of the first metal layer is higher than that of the second metal layer. Moreover, the data line includes, for example but not limited to, multilayer metal structure such as molybdenum, aluminum and molybdenum or other multilayer metal structure.

In one embodiment of the invention, the repair pad, for example, and the scan lines are comprised of same material. The repair pad, for example, is disposed under the data lines, or a portion of the repair pad is disposed under the data lines.

In one embodiment of the invention, the pixel electrode is comprised of, for example but not limited to, indium tin oxide (ITO), indium zinc oxide (IZO), indium-tin-zinc-oxide (ITZO) or other conductive material.

In one embodiment of the invention, the thin film transistor includes, for example but not limited to, a bottom gate amorphous silicon (a-Si) thin film transistor (TFT), a top gate a-Si TFT, a bottom gate polysilicon thin film transistor (TFT), a top gate polysilicon thin film transistor (TFT), a bottom gate low temperature polysilicon thin film transistor (LTPS-TFT), or a top gate LTPS-TFT.

According to an embodiment of the present invention, a method of repairing the aforementioned thin film transistor (TFT) array substrate is provided. When at least a defective data line of the data lines and at least a defective scan line of the scan lines detected in the TFT array substrate, the defective data line is cut to form a defective line disposed above the defect scan line and two normal lines disposed on both sides of the defective scan line. Thereafter, at least one quasi-welding repair pad corresponding to the defective data line and the normal lines are welded. Then, at least one repair line is formed to cross over the defective scan line so as to connect with the normal lines and the pair quasi-welding repair pad.

In one embodiment of the invention, the defective data line is cut by, for example but not limited to, using a laser cutting method. Further, the repair line is formed, for example but not limited to, by performing a laser chemical vapor deposition (CVD) process.

In one embodiment of the invention, in the step of welding the quasi-welding repair pad, the quasi-welding repair pads are set in pairs and located on two sides of an intersection of the scan line and the data line respectively.

In one embodiment of the invention, in the step of welding the quasi-welding repair pad, the quasi-welding repair pads are set in pairs and located on two sides of an intersection of a common line and the data line respectively.

In one embodiment of the invention, in the step of welding the quasi-welding repair pad, the quasi-welding repair pads are set in pairs and disposed under the data lines.

Accordingly, the present invention provides the repair pad disposed under the data line. In addition, the repair pads are disposed on both sides of the intersection of the scan line and the data line, or disposed on both sides of the intersections of the common line and the data line. Therefore, the defective data line (or normal line) that is cut could be welded to the corresponding pair of quasi-welding repair pads. Thereafter, the repair line is formed to complete the repair.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The following drawings illustrate embodiments of the invention and, together with the description, serve to explain the principles of the invention.

DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 3:
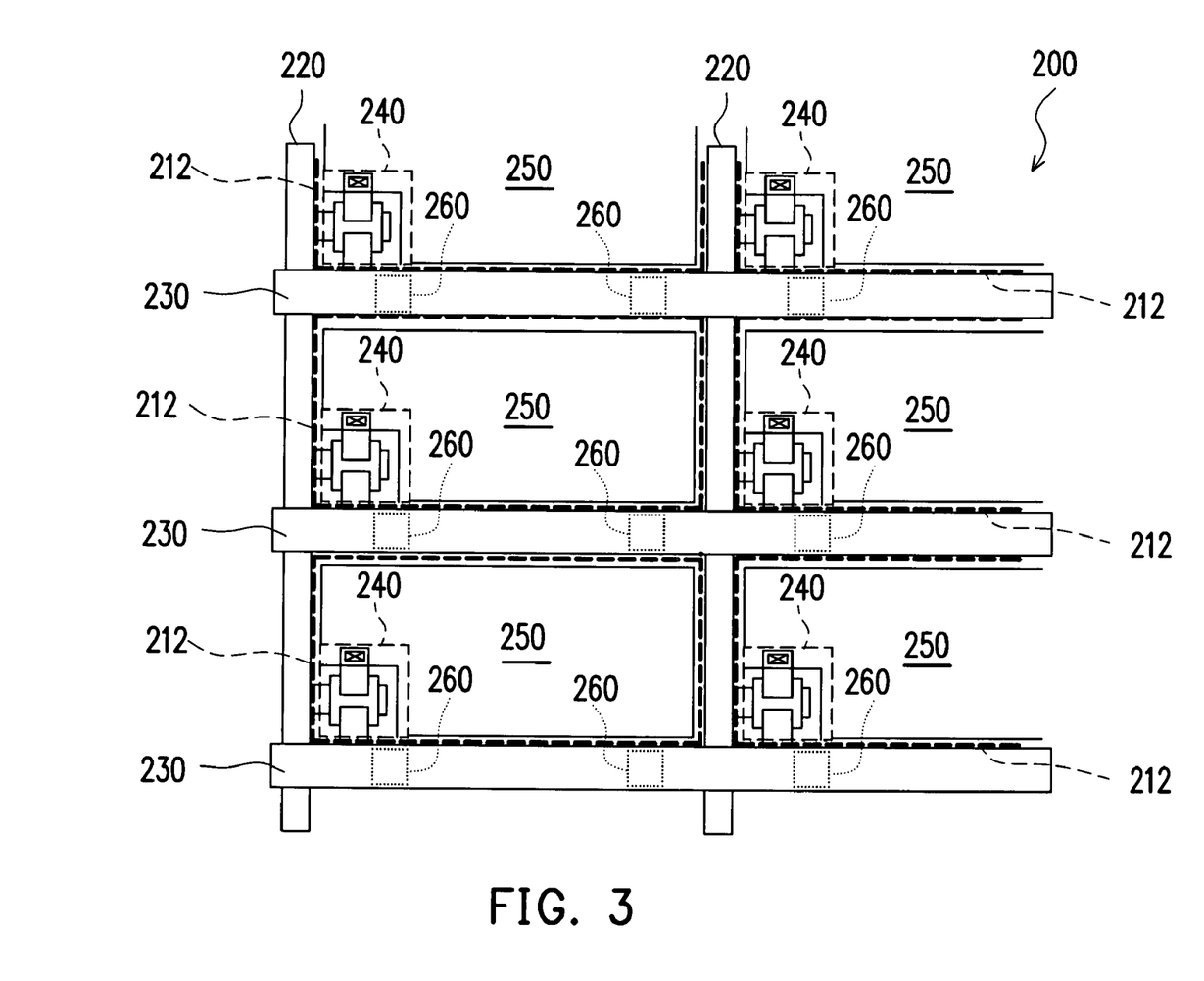
FIG. 3 is a drawing schematically illustrating a thin film transistor array substrate according to one embodiment of the present invention.

FIG. 3 is a drawing schematically illustrating a thin film transistor array substrate according to one embodiment of the present invention. Referring to FIG. 3, the thin film transistor (TFT) array substrate 200 comprises, for example but not limited to, a substrate 210 (shown in FIG. 5), a plurality of scan lines 220, a plurality of data lines 230, a plurality of thin film transistors 240, a plurality of pixel electrodes 250, and a plurality pairs of repair pads 260. The scan lines 220 and data lines 230 are formed over the substrate 210 to define a plurality of pixel regions 212 over the substrate 210. The thin film transistors 240 are disposed in each pixel region 212 respectively and driven by the corresponding scan line 220 and data line 230. The pixel electrodes 250 are also disposed in each pixel region 212 respectively and electrically connected to the corresponding thin film transistor 240. The repair pads of each pair of repair pads 260 are disposed at of the intersection of each scan line 220 and data line 230. Each pair of repair pads 260 is disposed under the corresponding data line 230. Furthermore, the repair pads 260 are formed together with the gate of the thin film transistor 240, thus the material of the repair pads 260 is, for example but not limited to, the same as that of the scan line.

In one embodiment of the invention, the substrate 210 comprises, for example but not limited to, glass, quartz, plastic, or other transparent insulation substrate. The scan line 220 and the data line 230 are comprised of, for example but not limited to, aluminum (Al), chromium (Cr), titanium (Ti), tungsten (W), tantalum (Ta), molybdenum (Mo), or a multilayer structure or alloys thereof. The thin film transistor 240 includes, for example but not limited to, a bottom gate amorphous silicon (a-Si) TFT, a bottom gate polysilicon TFT or a bottom gate low temperature polysilicon TFT (LTPS-TFT). The thin film transistor 240 includes, for example but not limited to, a top gate a-Si TFT, a top gate polysilicon TFT or a top gate LTPS-TFT. A thin film transistor 240 including the bottom gate a-Si TFT will be described in detail in reference with FIG. 3 according to one embodiment of the invention.

Referring to FIG. 3, the pixel electrode 250 comprises, for example but not limited to, indium tin oxide (ITO), indium zinc oxide (IZO) or other conductive transparent materials, or other conductive material with light reflecting property such as metal. In other words, when the pixel electrode 250 is comprised of transparent material, a transparent liquid crystal panel may be constructed by combining the TFT array substrate 200 with the other opposite aligned substrate. On the other hand, when pixel electrode 250 is comprised of metal or other light reflecting material, a reflective liquid crystal panel may be constructed when the TFT array substrate 200 is combined the other opposite aligned substrate. Moreover, when one portion of the pixel electrode 250 is comprised of transparent material and the other portion thereof is comprised of metal or other light reflecting material, a semi-transparent semi-reflective liquid crystal panel may be formed after the TFT array substrate 200 and the other opposite aligned substrate are combined.

Figure 4:
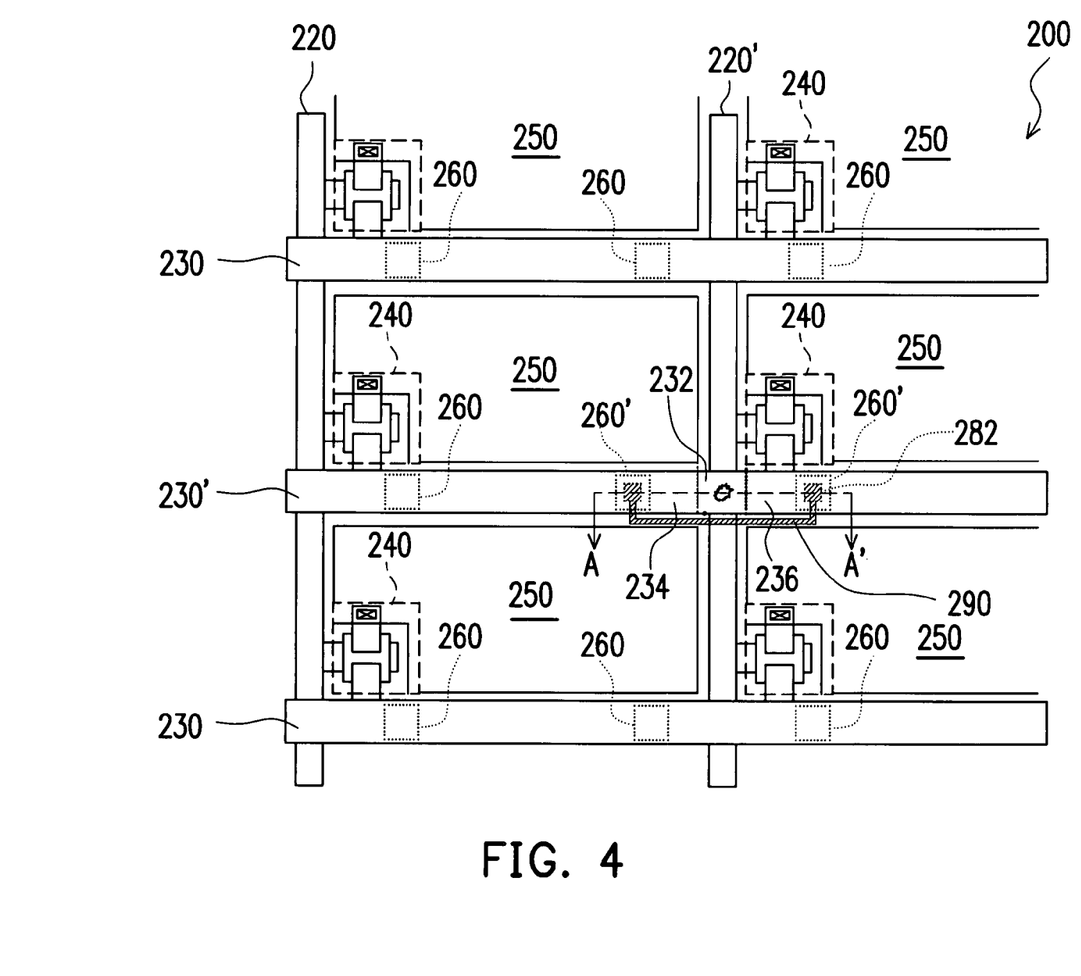
FIG. 4 is a drawing schematically illustrating the TFT array substrate of FIG. 3 after being repaired by a laser repairing method.
Figure 5:
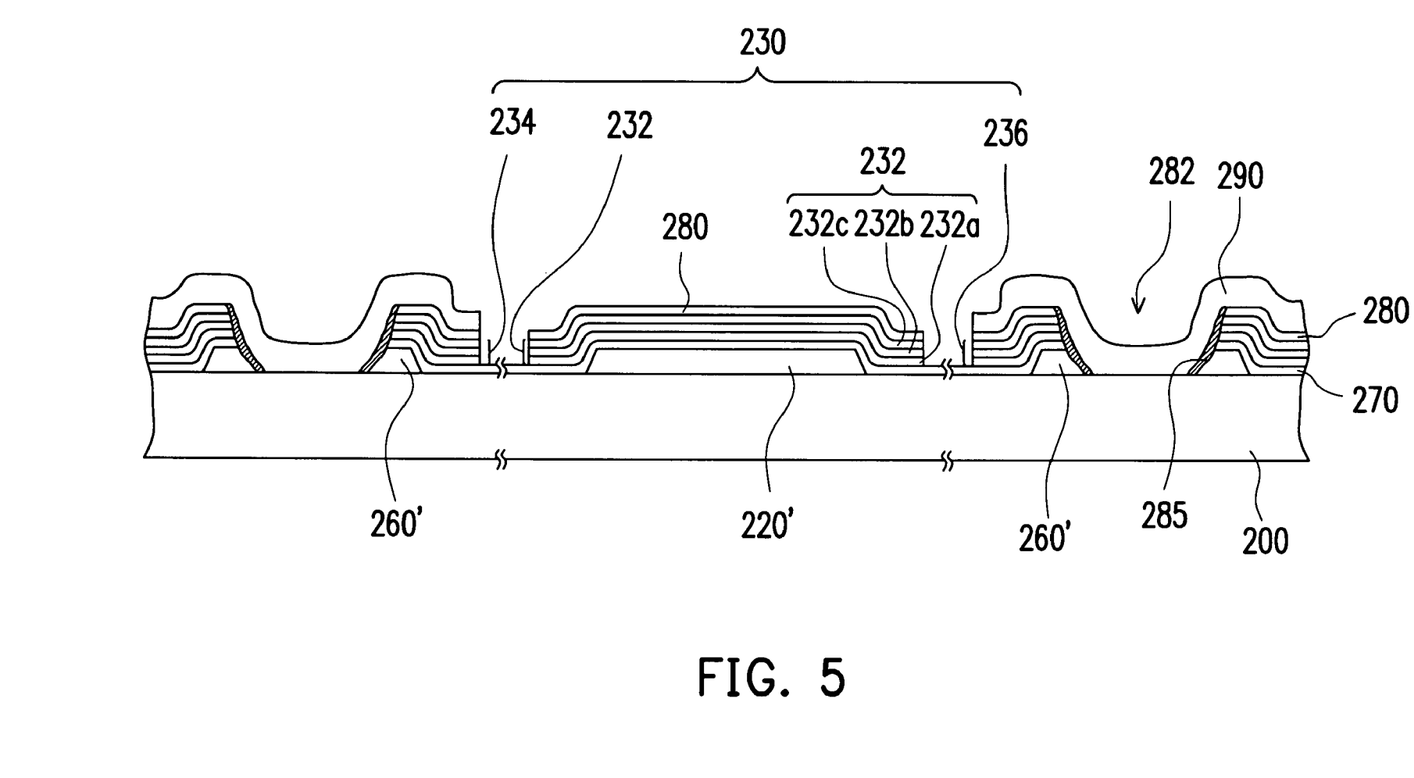
FIG. 5 is a cross-sectional view schematically illustrating the TFT array substrate of FIG. 4 taken along line A–A'.

FIG. 4 is a drawing schematically illustrating the TFT array substrate of FIG. 3 after being repaired by a laser repairing method. FIG. 5 is a cross-sectional view schematically illustrating the TFT array substrate of FIG. 4 taken along line A–A'.

Referring to FIG. 4, when a defective scan line 220' and a defective data line 230' are abnormally conductive at the intersection of both, the data signal can not be written into the pixel controlled by the defective scan line 220' and the defective data line 230'. Therefore, the pixel needs to be repaired. In one embodiment of the present invention, the defective data line 230' is cut to form a defective line 232 and two normal lines 234, 236 at both sides of the defective scan lines 220'. The defective line 232 is above the defective scan line 220', and the normal lines 234 and 236 are at both sides of the defective scan line 220' respectively. In addition, the defective data line 230' is cut by using, for example but not limited to, a laser cutting method.

Thereafter, referring to FIG. 4 and FIG. 5, after the defective data line 230' is cut to form the defective line 232 and the normal lines 234 and 236, a pair of quasi-welding repair pads 260' corresponding to the defective data line 230 are welded to the normal line 234 and 236 respectively. It is noted that, the quasi-welding repair pads 260' and the normal lines 234 and 236 are welded by using, for example but not limited to, a laser beam. The protection layer 280 above the normal lines 234 and 236 are irradiated by the laser beam to form an opening 282. Thereafter, the normal lines 234 and 236, the inter-gate dielectric layer 270 and the quasi-welding repair pad 260' are irradiated by the laser beam, and then the inter-gate dielectric layer 270 will be burned through to weld the normal lines 234 and 236 with corresponding quasi-welding repair pads 260' respectively. The normal lines 234 and 236 are electrically connected to the corresponding quasi-welding repair pads 260' respectively by welding metal 285. In the embodiment, the welding metal 285 is generated during the laser beam welding process, and gets deposited on, for example but not limited to, at least a portion of the sidewall of the opening 282.

Then, a repair line 290 crossing over the defective scan line 220' is formed after the laser beam welding process to reconnect the normal lines 234 and 236 that correspond to the quasi-welding repair pad 260'. In one embodiment, the repair line 290 is formed by performing, for example but not limited to, a laser chemical vapor deposition (CVD) process.

Thereafter, the normal lines 234 and 236 of the defective data line 230' are welded to a portion of the quasi-welding repair pad 260' after the TFT array substrate 200 is repaired and electrically connected to each other by the repair line 290. Therefore, the defective line 232 of the defective data line 230' that is conducted to the defective scan line 220' will not adversely influence the driving of the pixel.

Thereafter, referring to FIG. 5, in one embodiment, the data line 230 comprised of, for example but not limited to, a multilayer metal structure such as a first metal layer 232, a second metal layer 234 and third metal layer 236. In addition, the melting point of the first metal layer 232 is higher than that of the second metal layer 234. The first metal layer 232 and the third metal layer 236 is comprised of, for example but not limited to, a molybdenum metal having a high melting point. The second metal layer 234 is comprised of, for example but not limited to, aluminum metal having a low melting point lower. For example, when the data line 230 is a multilayer metal structure comprised of molybdenum, aluminum and molybdenum, if a conventional design and repairing method is applied, the repairing process will fail. However, in the embodiment of the invention, the normal lines 234 and 236 are welded to the quasi-welding repair pads 260' and electrically connected to each other by repair line 290. Therefore, the forming and breaking of the bending profile A near the repair line 112 as shown in FIG. 2 will not occur in the present invention. Thus, the repairing yield can be effectively increased.

Figure 6A:
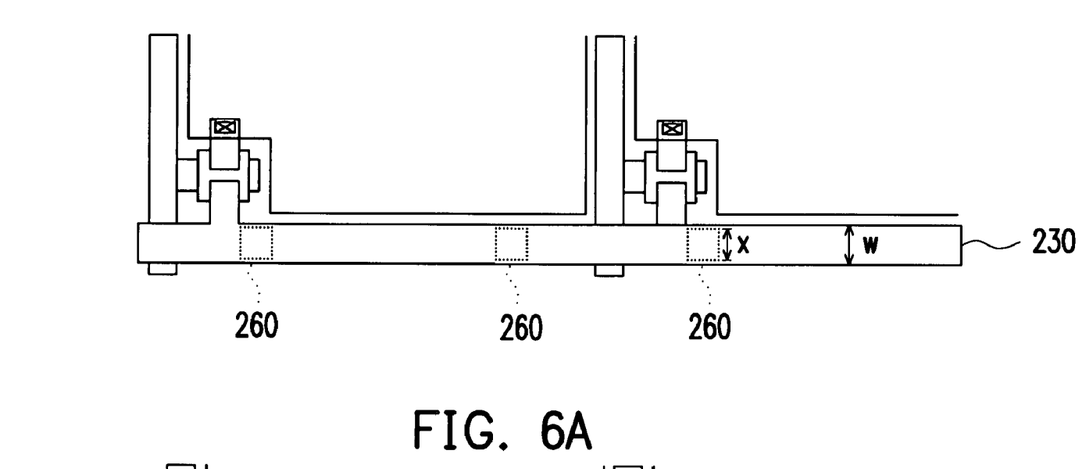
FIG. 6A, FIG. 6B and FIG. 6C are views schematically illustrating the distribution of repair pads and data lines with different sizes according to one embodiment of the present invention.
Figure 6B:
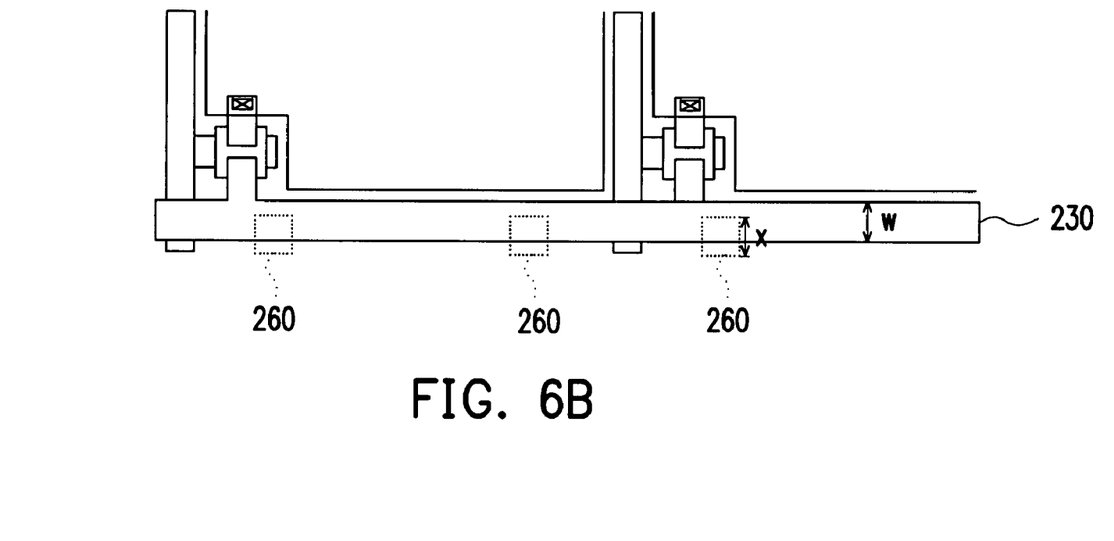
Figure 6C:
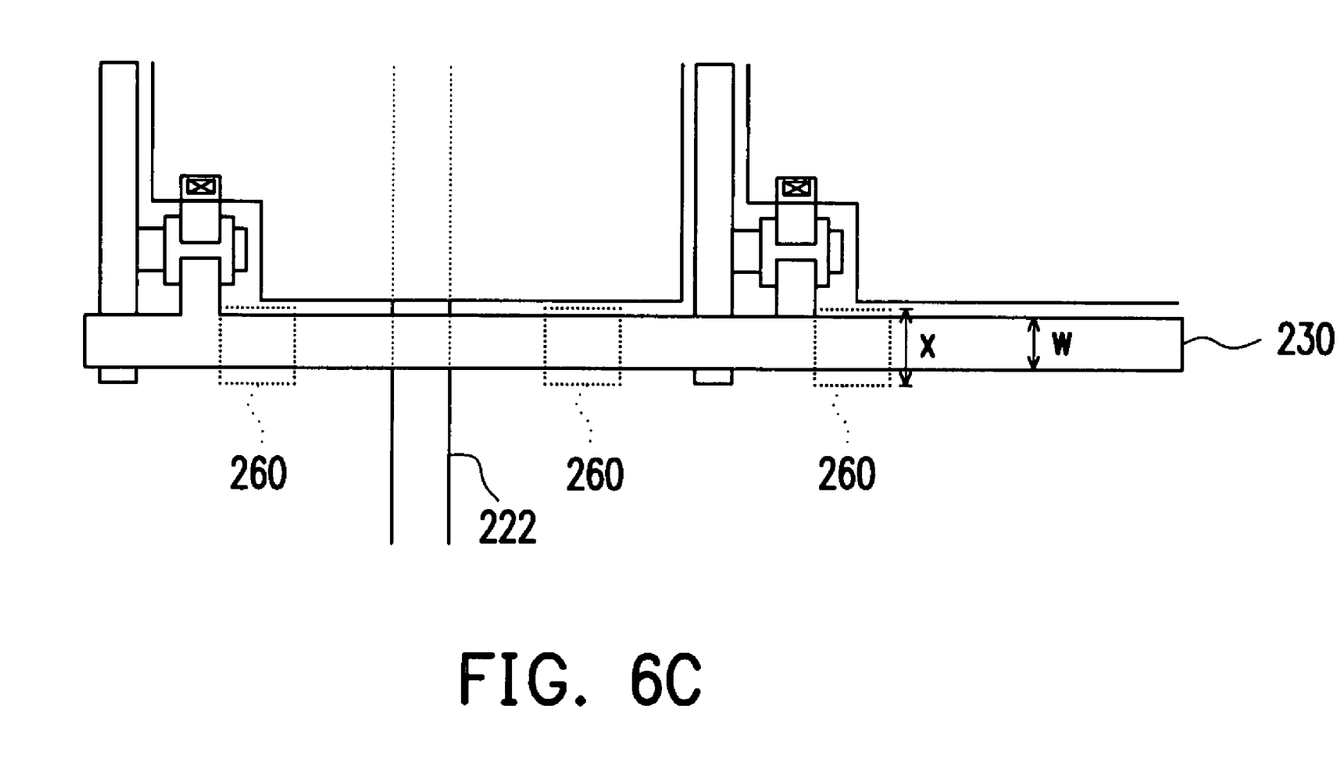

FIG. 6A, FIG. 6B and FIG. 6C are views schematically illustrating the distribution of repair pads and data lines with different sizes according to one embodiment of the present invention. Referring to FIG. 6A to FIG. 6C, the size X of the repair pad 260 is, for example but not limited to, less than the width W of the data line 230 (as shown in FIG. 6A), equal to the width W of the data line 230 (as shown in FIG. 6B), or larger than the width W of the data line 230 (as shown in FIG. 6C). Furthermore, the repair pad 260, for example but not limited to, need not be totally disposed under the data line 230 (as shown in FIG. 6A), or a portion of the repair pad 260 is disposed under the data line 230 (as shown in FIG. 6B and FIG. 6C). It is noted that, those skilled in the art may change the shape, distribution, position, size and so on, of the repair pads 260, which is still within the scope and spirit of the present invention.

Referring to FIG. 6C, it is noted that in one embodiment of the invention, the repair pads (or the quasi-welding repair pads) 260 are set in pairs and located on two sides of an intersection of the scan line and the data line 230 respectively.

In addition, referring to FIG. 6C, it is noted that in one embodiment of the invention, the repair pads (or the quasi-welding repair pads) 260 are set in pairs and can also be located on two sides of an intersection of a common line 222 and the data line 230 respectively. The characteristic and function of the repair pad of the present embodiment is similar to the other embodiments described above and will not be described in detail.

Figure 7:
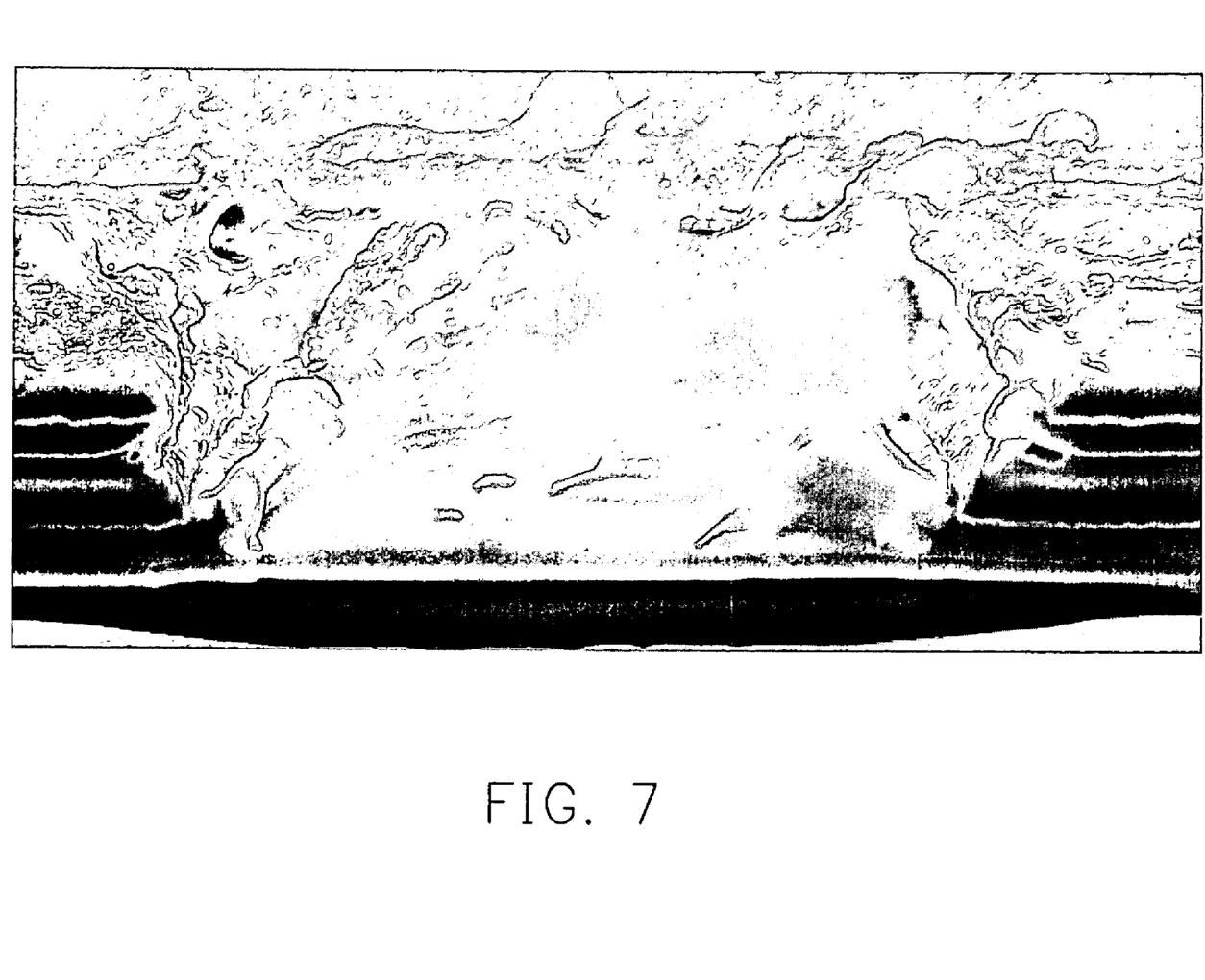
FIG. 7 is a cross-sectional view illustrating a repaired portion after the normal line and the quasi-welding repair pads are welded according to one embodiment of the present invention.
Figure 8:
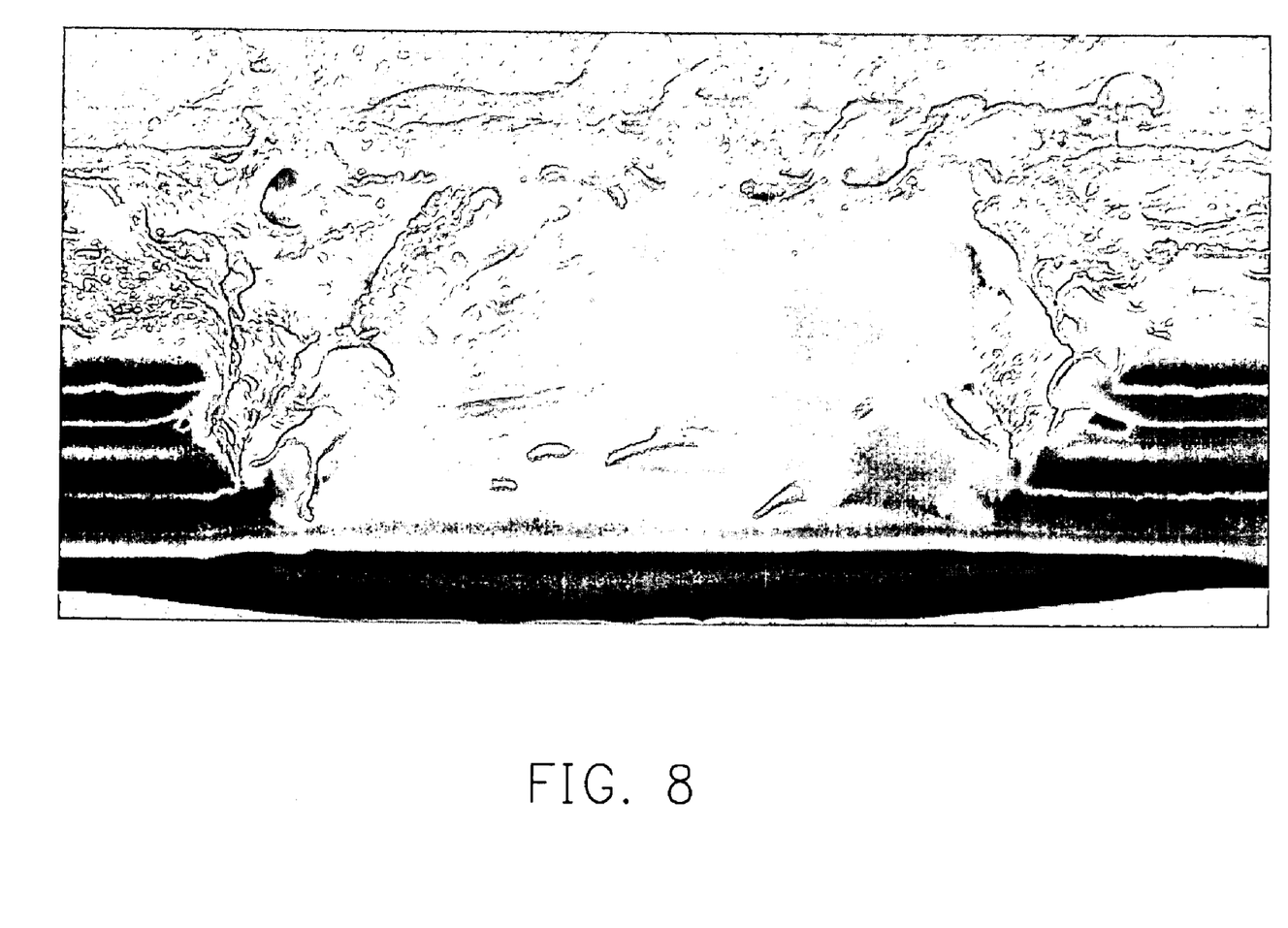
FIG. 8 is a cross-sectional view illustrating the repaired portion after the laser repairing method is applied according to one embodiment of the present invention.

FIG. 7 is a cross-sectional view illustrating a repaired portion after the normal line and the quasi-welding repair pads are being welded according to one embodiment of the present invention. FIG. 8 is a cross-sectional view illustrating the repaired portion after the laser repairing method is applied according to one embodiment of the present invention. Referring to FIG. 7, after the normal line and the quasi-welding repair pads are welded, a repair line with a bent profile will not generated at the welded surface thereof. Therefore, the repair line formed by the laser chemical vapor deposition (CVD) process will not break easily.

Accordingly, the TFT array substrate and the method of repairing thereof is capable of providing a high repairing yield compared to that of the conventional technology. Furthermore, because the repair pad may be formed together with the gate of the thin film transistor, and therefore this will not incur additional cost.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. thin film transistor (TFT) array substrate, comprising:
a substrate;
a plurality of scan lines disposed over the substrate;
a plurality of data lines disposed over the substrate, wherein a plurality of pixel regions are defined by the scan lines and the data lines;
a plurality of thin film transistors in the pixel regions and driven by the scan lines and the data lines;
a plurality of pixel electrodes in the pixel regions and electrically connected to the thin film transistors; and
a plurality of repair pads disposed under the data lines, wherein the repair pads and the scan lines are configured in a same layer.

2. The TFT array substrate of claim 1, further comprising:
a plurality of quasi-welding repair pads disposed under the data lines; and
at least a repair line, crossing over at least a defective scan line of the scan lines, wherein the defective data line comprises:
a defective line above the defective scan line and two normal lines on both sides of the defective scan line, wherein the normal lines are welded to the quasi-welding repair pad connected by the repair line.

3. The TFT array substrate of claim 2, wherein the quasi-welding repair pads are set in pairs.

4. The TFT array substrate of claim 2, wherein the quasi-welding repair pads are set in pairs, and a partial portion of the quasi-welding repair pads are disposed under the data lines.

5. The TFT array substrate of claim 1, wherein the data line comprises a multilayer metal structure comprising a first metal layer, a second metal layer and a third metal layer, wherein a melting point of the first metal layer is higher than a melting point of the second metal layer.

6. The TFT array substrate of claim 1 wherein the data line comprises a multilayer metal structure comprising molybdenum, aluminum and molybdenum.

7. The TFT array substrate of claim 1, wherein a material of the repair pads and a material of the scan lines are the same.

8. The TFT array substrate of claim 1, wherein the repair pads are set in pairs and located on two sides of an intersection of the scan line and the data line.

9. The TFT array substrate of claim 1, wherein a partial portion of the repair pads is disposed under the data lines.

10. The TFT array substrate of claim 1, wherein the pixel electrodes comprise indium tin oxide (ITO), indium zinc oxide (IZO) or indium-tin-zinc-oxide (ITZO).

11. The TFT array substrate of claim 1, wherein the thin film transistor comprises amorphous silicon thin film transistor, polysilicon thin film transistor or low temperature polysilicon thin film transistor.

12. The TFT array substrate of claim 1, wherein the thin film transistor comprises a bottom gate thin film transistor or a top gate thin film transistor.

13. The UT array substrate of claim 1, further comprising:
a plurality of common lines disposed over the substrate.

14. The TFT array substrate of claim 13, wherein the repair pads are set in pairs and located on two sides of an intersection of the common line and the data line.

* * * * *